(12) United States Patent
Putnik et al.

(10) Patent No.: US 11,480,420 B2
(45) Date of Patent: Oct. 25, 2022

(54) METHOD AND APPARATUS FOR DETERMINING THE TWO-POINT SIZE OF A WORKPIECE

(71) Applicants: MITUTOYO CORPORATION, Kanagawa (JP); Mitutoyo Europe GmbH, Neuss (DE)

(72) Inventors: Erich Otto Putnik, Oberndorf/Neckar (DE); Till Martin Bruckdorfer, Schramberg (DE)

(73) Assignees: MITUTOYO CORPORATION, Kanagawa (JP); MITUTOYO EUROPE GMBH, Neuss (DE)

( * ) Notice: Subject to any disclaimer, the term of this patent is extended or adjusted under 35 U.S.C. 154(b) by 124 days.

(21) Appl. No.: 17/109,594

(22) Filed: Dec. 2, 2020

(65) Prior Publication Data
US 2021/0190469 A1 Jun. 24, 2021

(30) Foreign Application Priority Data
Dec. 18, 2019 (DE) .................... 10 2019 008 821.2

(51) Int. Cl.
*G01B 5/20* (2006.01)
(52) U.S. Cl.
CPC ..................... *G01B 5/20* (2013.01)
(58) Field of Classification Search
USPC ......... 33/501.02, 549, 555.1, 550, 551, 553, 33/554
See application file for complete search history.

(56) References Cited

U.S. PATENT DOCUMENTS

| | | | | |
|---|---|---|---|---|
| 3,400,463 A * | 9/1968 | Barringer | ................. | G01B 7/34 33/554 |
| 4,080,741 A * | 3/1978 | Siddall | .................... | G01B 7/293 33/645 |
| 4,977,682 A * | 12/1990 | Allen, III | ............... | G01B 5/201 33/550 |
| 6,175,813 B1 * | 1/2001 | Purchase | ................. | G01B 7/12 702/155 |
| 8,332,173 B2 * | 12/2012 | Ishikawa | .............. | G01B 21/045 702/155 |
| 9,335,143 B2 | 5/2016 | Noda et al. | | |
| 9,464,877 B2 * | 10/2016 | Nakagawa | ............. | G01B 5/016 |
| 10,132,622 B2 * | 11/2018 | Ould | ...................... | G01B 21/04 |
| 10,161,747 B2 | 12/2018 | Sakai et al. | | |
| 10,794,688 B2 | 10/2020 | Motohashi et al. | | |
| 10,900,764 B2 * | 1/2021 | Tamai | .................... | G01B 5/016 |

(Continued)

FOREIGN PATENT DOCUMENTS

| | | | | |
|---|---|---|---|---|
| DE | 102005032749 A1 * | 1/2007 | .......... | G01B 21/045 |
| DE | 102018115891 A1 * | 1/2020 | | |
| EP | 1467175 A2 * | 10/2004 | ............... | G01B 7/12 |

*Primary Examiner* — Christopher W Fulton
(74) *Attorney, Agent, or Firm* — Greenblum & Bernstein, P.L.C.

(57) ABSTRACT

A computer-implemented method for determining a two-point size of a workpiece includes receiving a set of measuring points of the workpiece, determining a longitudinal axis of the workpiece based on the set of measuring points, projecting at least a part of the set of measuring points into a projection plane perpendicular to the longitudinal axis to obtain a set of projection points, and determining a two-point size of the workpiece based on the projection point.

12 Claims, 4 Drawing Sheets

(56) References Cited

U.S. PATENT DOCUMENTS

| | | | |
|---|---|---|---|
| 11,041,707 B2* | 6/2021 | Omori | G01B 7/282 |
| 2005/0039342 A1* | 2/2005 | Kirstine | G01B 5/30 |
| | | | 33/552 |
| 2005/0263727 A1* | 12/2005 | Noda | G01B 5/008 |
| | | | 250/559.29 |
| 2013/0255092 A1* | 10/2013 | Trionfetti | G01B 5/08 |
| | | | 33/555.1 |
| 2017/0167852 A1 | 6/2017 | Miki | |

* cited by examiner

METHOD AND APPARATUS FOR DETERMINING THE TWO-POINT SIZE OF A WORKPIECE

CROSS-REFERENCE TO RELATED APPLICATIONS

The present application claims priority under 35 U.S.C. § 119 of German Application No. 10 2019 008 821.2, filed on Dec. 18, 2019, the disclosure of which is expressly incorporated by reference herein in its entirety.

BACKGROUND OF THE INVENTION

1. Field of the Invention

The present invention relates to the field of measuring workpieces and more particular to a method and apparatus for determining the two-point size of a workpiece.

2. Description of Related Art

The two-point size of a workpiece, preferably of a workpiece having a substantially cylindrical shape, is a (local size) distance between two points of the surface of the workpiece opposed to each other with respect to the longitudinal axis of the workpiece. In case of a cylindrical workpiece, the two points are opposed to each other with respect to the cylinder axis of the workpiece.

Known methods for determining the two-point size require measuring data (e.g., measuring points) obtained from measuring the workpiece circumferentially around a longitudinal axis of the workpiece (e.g., a cylinder axis of a cylindrical workpiece) and at different positions along the longitudinal axis. Measuring points obtained from circumferentially measuring the workpiece around the longitudinal axis at one position represent a revolution of the workpiece and said measuring points lie substantially in a plane perpendicular to the longitudinal axis of the workpiece. However, to measure the workpiece as accurately as possible, a large number of revolutions of the workpiece have to be measured (i.e., revolutions at different positions along the longitudinal axis of the workpiece), wherein each revolution is displaced—along the longitudinal axis of the workpiece. Further, measuring the workpiece requires that a probe measuring the workpiece must be aligned for each single revolution, i.e., aligned at a new position along the longitudinal axis of the workpiece. This results in as many individual measurements as revolutions are measured the measuring points are not measured continuously. Accordingly, for obtaining an accurate two-point size of the workpiece, the measuring of the workpiece is lengthy and cumbersome.

SUMMARY OF THE INVENTION

The present disclosure has been made in view of the above and it is a feature of the present disclosure to provide a method and an apparatus for determining the two-point size of a workpiece, which allows a fast measuring of the workpiece while providing an accurate determination of the two-point size of the workpiece.

Specifically, the present disclosure allows determining an accurate two-point size of the workpiece while the measuring of the workpiece can be performed quickly.

This feature is achieved by the subject-matter of the independent claims. Preferred embodiments are defined in the dependent claims. An aspect of the disclosure relates to a computer implemented method for determining the two-point size of a workpiece, the method includes the following processes: receiving a set of measuring points of the workpiece; determining a longitudinal axis of the workpiece based on the set of measuring points; projecting at least a part of the set of measuring points into a projection plane perpendicular to the longitudinal axis to obtain a set of projection points; and determining a two-point size of the workpiece based on the set of projection points.

Advantageously, the method allows determining the two-point size of a workpiece using measuring points that have been continuously measured and that may not lie in a plane perpendicular to the longitudinal axis of the workpiece because the measuring points are projected in the projection plane and the two-point size is determined based on the projection points. Continuously measured means that the measuring points have been captured with a single measurement. Accordingly, the measuring of the workpiece can be performed faster while the two-point size can still be accurately determined. Preferably, the set of measuring points are obtained from measuring the surface of the workpiece with a measuring apparatus. Each measuring point may represent a three-dimensional (3D) position information of a measured location of the surface of the workpiece with respect to a reference location, e.g., a 3D coordinate of the measured location. The measuring points may be preferably obtained from a coordinate measuring apparatus measuring the workpiece. Example coordinate measuring apparatuses may obtain the measuring points using a probe that samples the workpiece. The probe may be configured to contact the surface for measuring the workpiece, e.g., with a stylus tip, or the probe may be configured to measure the surface contactless, e.g., optically, computer tomography and/or x-ray based. Further, it is preferred that the measuring apparatus and/or probe measures the workpiece in a single scan. That is, the measuring points are preferably captured with the single scan.

Further, each projection point of the set of projection points that is projected into the projection plane may correspond to a measuring point of the set of measuring points. Specifically, each projection point of the set of projection points may correspond to a different measuring point of the set of measuring points. Due to projecting the part of the set of measuring points into the projection plane, each projection point of the set of projection points may represent a two-dimensional (2D) position information, e.g., a 2D coordinate.

Preferably, the (complete) set of measuring points is projected into the projection plane, i.e. all measuring points of the set of measuring points, to obtain the set of projection points. Further, the projection plane which is perpendicular to the longitudinal axis of the workpiece may have a normal being parallel to the longitudinal axis of the workpiece. Alternatively, the set of measuring points may by analyzed for incorrect measuring points (i.e., outliers) that are not projected into the projection plane so that only a part of the measuring points is projected into the projection plane.

Preferably, the set of measuring points may include or consist of measuring points obtained from a helix-measurement of the workpiece and/or the workpiece may have a substantially cylindrical shape.

Advantageously, a helix-measurement of a preferably substantially cylindrical workpiece allows a faster measurement of the workpiece compared to known measurement methods discussed above. With a helix-measurement, the surface of the workpiece may be measured along a path having a substantially helical trajectory, e.g., a path having the form of a screw's thread. Specifically, the helix-measurement results in a set of measuring points having a substantially regular, non-zero axial difference along the longitudinal axis of the workpiece (e.g., the cylinder axis of a cylindrical workpiece) between consecutive and/or adjacent measuring points of the set of measuring points. That is, compared to conventional measuring methods in which measuring points of one revolution lie substantially in a plane perpendicular to the longitudinal of the workpiece, measuring points of one revolution obtained with a helix-measurement are not lying in a plane perpendicular to the longitudinal axis of the workpiece. Further, the helix-measurement allows to measure the workpiece without aligning the probe along the longitudinal axis for each revolution of the workpiece and thus, the measurement can be performed faster. Preferably, the helix-measurement is applicable to workpieces having a substantially cylindrical shape.

Further, the set of measuring points obtained with a helix-measurement may include measuring points obtained from at least one revolution around the longitudinal axis of the workpiece and/or the cylinder axis of a substantially cylindrical workpiece. Preferably, the set of measuring points may include measuring points obtained from a plurality of revolutions around the longitudinal axis of the workpiece and/or the cylinder axis of a substantially cylindrical workpiece. One revolution may be determined from the measuring points by summing up the angular difference around the longitudinal axis of the workpiece and/or around the cylinder axis of a cylindrical workpiece between consecutive and/or adjacent measuring points up to 360 degrees.

Preferably, the step of determining the longitudinal axis of the workpiece may include determining a shape model of the workpiece based on the set of measuring points and providing the longitudinal axis of the shape model as the longitudinal axis of the workpiece. Usually, the workpiece has not a perfect shape, e.g. a perfect cylindrical shape. That is, in case of a cylindrical workpiece the diameter of the workpiece may vary depending from the measuring location. Such deviations are reflected in the set of measuring points and the shape model advantageously provides an approximation of the workpiece's shape allowing the determination of the longitudinal axis of the workpiece.

Preferably, for a substantially cylindrical workpiece, the shape model may be a cylindrical shape model, preferably a Gaussian cylindrical shape model, and the longitudinal axis of the workpiece may correspond to a cylinder axis of the cylindrical shape model. The Gaussian cylindrical shape model may provide a cylindrical shape model being arranged as close as possible to the part of the set of measuring points and/or as close as possible to the set of measuring points. In particular, the Gaussian cylindrical shape model may be obtained by using the method of least squares on the set of measuring points.

However, dependent on the circumstances, a different cylindrical shape model may be applied. For example, the cylindrical shape model may include at least one of a minimum circumscribed cylindrical shape model and a maximum inscribed cylindrical shape model.

Advantageously, the cylindrical shape model provides a good approximation of the cylindrical workpiece's shape. Hence, the cylindrical shape model allows providing a good approximation of the longitudinal axis of the workpiece and/or the cylinder axis of the cylindrical workpiece.

Preferably, the step of projecting at least the part of the set of measuring points into the projection plane and/or projecting the set of measuring points into the projection plane may include projecting at least the part of the set of measuring points and/or the set of measuring points parallel to the longitudinal axis. Thus, each projection point of the set of projection points may be obtained by projecting a corresponding measuring point of the set of measuring points into the projection plane parallel to the longitudinal axis of the workpiece and/or the cylinder axis of the workpiece (in case of a cylindrical workpiece).

Preferably, the step of determining the two-point size of the workpiece may include determining a circle center of a circle based on the set of projection points, wherein the circle is preferably a Gaussian circle determined from the set of projection points. That is, the circle is determined from the set of projection points. Further, a Gaussian circle may be a circle that lies in the middle between the set of projection points in the best possible way.

Moreover, the step of determining the two-point size of the workpiece may include determining a pair of points based on the set of projection points, wherein the pair of points oppose each other with respect to the circle center, and determining the two-point size by calculating the distance between the pair of points. Further, the determining of the circle center may be performed for a cylindrical workpiece.

Advantageously, the determination of the circle center results in a good approximation of the circle center as the workpiece may usually not have a perfect shape as discussed above. Using the determined circle center allows an accurate determination of the two-point size of the workpiece. Further, the circle determined from the set of projected points is not limited to a Gaussian circle. For example, the determined circle may include at least one of a minimum circumscribed circle and a maximum inscribed circle determined from the set of projection points.

Preferably, the pair of points may include at least one point of the set of projection points and in case the other point of the pair of points is not included in the set of projection points, the method further includes determining the other point by interpolation based on the set of projection points. Alternatively, both points of the pair of points may be derived by interpolation of the set of projection points.

Advantageously, it is possible to determine the two-point size also for cases in which the set of projection points does not include projection points that oppose each other with respect to the circle center.

Preferably, the set of measuring points may include at least one subset of measuring points corresponding to one revolution of the workpiece and the set of projection points includes at least one subset of projection points which corresponds to the at least one subset of measuring points. A subset of projection points may be obtained by projecting a respective subset of measuring points parallel to the longitudinal axis into the projection plane. Further, it is preferred that the set of measuring points may include more than one subset of measuring points, each subset of measuring points corresponding to a different revolution of the workpiece. Specifically, the number of subsets of measuring points may be equal to the number of revolutions with which the workpiece is measured. Further, each subset of measuring points may be projected into the projection plane to obtain a respective subset of projection points.

That is, for each revolution with which the workpiece is measured, a respective subset of projection points is obtained. Accordingly, it is possible to determine a two-point size for each revolution of the workpiece.

A subset of measuring points corresponding to one revolution of the workpiece may be determined from the set of measuring points. Specifically, the set of measuring points may be projected perpendicular on the longitudinal axis of the workpiece, i.e., the longitudinal axis of the shape model (e.g., the cylinder axis of the cylindrical shape model), resulting in a set of intermediate points distributed on said longitudinal axis. From the set of intermediate points, a first intermediate point and a second intermediate point are determined, wherein the first intermediate point and the second intermediate point have the largest distance to each other among possible point pairs of the set of intermediate points. The remaining intermediate points of the set of intermediate points, i.e., the set of intermediate points without the first intermediate point and second intermediate point, are sorted based on their distance to the first intermediate point or second intermediate point. For example, the remaining intermediate points may be sorted in ascending order of their distance to the first intermediate point or to the second intermediate point. The first intermediate point, the sorted remaining intermediate points, and the second intermediate point constitute a set of sorted intermediate points, wherein each point of the set of sorted intermediate points can be referred to its corresponding measuring point of the set of measuring point.

Moreover, the determination of a subset of measuring points corresponding to one revolution can be based on a distance criterion or on an angular criterion. For example, the distance criterion may depend on the measuring process of the workpiece. Specifically, the distance criterion may correspond to the distance along the scan axis of the workpiece required for measuring one revolution of the workpiece, e.g., a slice thickness. Alternatively, a user may define the distance criterion.

Based on the distance criterion, the subset of measuring points may be determined from the set of measuring points by referring to subsequent points from the set of sorted intermediate points just fulfilling the distance criterion, i.e., the distance between the first point of the subsequent points and the last point of the subsequent points just fulfils the distance criterion. For example, points from the set of measuring points may be allocated to the subset of measuring points by referring to corresponding subsequent points from the set of sorted intermediate points until the distance between the first point of the subsequent points and the last point of the subsequent points is greater or equal than the distance criterion. This process may be repeated for further revolutions, wherein the first point of the next subsequent points from the set of sorted intermediate points is the successor of the last point of the previous subsequent points from the set of sorted intermediate points.

When using the angular criterion instead of the distance criterion, subsequent points of the set of measuring points may be allocated to the subset of measuring points, taking into account the order provided by the set of sorted intermediate points, until the summed-up angle between the subsequent points with respect to the longitudinal axis (e.g., the cylinder axis of the cylindrical shape model) exceeds 360°.

For determining the angle between subsequent points with respect to the longitudinal axis, the subsequent points may be projected into a plane perpendicular to the longitudinal axis. This process may be repeated for further revolutions, wherein, for the next revolution, the first point of the next subsequent points is the successor of the last point of the previous subsequent points.

By determining the subset of measuring points based on the set of sorted intermediate points, errors in the order of the measuring points can be prevented. Specifically, subsequent measuring points of the set of measuring points can be close together so that the longitudinal difference along the scan axis is very low. In case the determined longitudinal axis of the shape model and/or the cylindrical axis of the cylindrical shape model is inclined with respect to the actual scan axis, it might be possible that the order of two successive points of the set of measuring points, when being projected on the determined longitudinal axis and/or cylindrical axis, are inverted in comparison to the projection of the set of measuring points on the scan axis.

Preferably, the step of determining the two-point size of the workpiece may include determining a respective circle center of a circle based on the at least one subset of projection points, wherein the circle is preferably a Gaussian circle, determining a pair of points from the at least one subset of projection points, wherein the pair of points is substantially opposite with respect to the circle center; and determine the two-point size by calculating the distance between the pair of points. Preferably, the two-point size is the sum of the distance of each point of the pair of points to the circle center.

Although the circle is preferably a Gaussian circle determined from the at least one subset of projection points, other circles are also applicable. For example, the determined circle may include at least one of a minimum circumscribed circle and a maximum inscribed circle determined from the at least one subset of projection points. Further, in a case of more than one subset of projection points, a respective circle and circle center for each subset of projection points may be determined. Further, a two-point size may be determined for each subset of projection points by determining a pair of points from each subset of projection points, the pair of points being opposite each other with respect to the circle center of the respective subset of projection points, and by determining the two-point size by calculating the distance between the pair of points.

Advantageously, the two-point size can be determined accurately from the set of measuring points while it is possible to perform a fast measurement of the workpiece.

Preferably, the respective pair of points for each subset of projection points may include at least one point of the subset of projection points and in case the other point of the pair of points is not included in the subset of projection points, the method may further include determining the other point by interpolation based on the subset of projection points. Alternatively, both points of the pair of points for each subset of projection points may be derived by interpolation of the respective set of projection points.

Advantageously, it is possible to determine two opposed points based from the subset of projection points although the subset of projection points may not include opposed projection points. Hence, itis possible to determine the two-point size even if the subset of projection points does not include opposed projection points.

Preferably, the step of determining the two-point size of the workpiece may include at least one of determining a minimum two-point size of the workpiece, a maximum two-point size of the workpiece, or an average two-point size of the workpiece.

A further aspect relates to an apparatus for determining the two-point size of a workpiece, the apparatus including: a receiving unit configured to receive a set of measuring points of the workpiece; and a determination unit configured to: determine a longitudinal axis of the workpiece based on the set of measuring points; project the set of measuring points into a projection plane perpendicular to the longitudinal axis to obtain a set of projection points; and determine a two-point size of the workpiece based on the projection points.

Further, the apparatus for determining the two-point size of the workpiece may receive the set of measuring points from a measuring apparatus as discussed above. Alternatively, the apparatus may include a measuring unit for measuring the workpiece. The measuring unit may measure the workpiece using a probe that samples the workpiece. The probe may be configured to contact the surface for measuring the workpiece, e.g., with a stylus tip, or the probe may be configured to measure the surface contactless, e.g., optically, computer tomography and/or x-ray based.

Further, the determination unit may be configured to perform the method discussed above.

A further aspect relates to a computer-readable medium including instructions which, when executed by a computer, cause the computer to carry out a method including the following: receiving a set of measuring points of the workpiece; determining a longitudinal axis of the workpiece based on the set of measuring points; projecting the set of measuring points into a projection plane perpendicular to the longitudinal axis to obtain a set of projection points; and determining a two-point size of the workpiece based on the set of projection points.

Further, the computer-readable medium may include instructions that allow executing the method discussed above. These and other objects, features and advantages of the present invention will become more apparent upon reading of the following detailed description of preferred embodiments and accompanying drawings. It should be understood that even though embodiments are separately described, single features thereof may be combined to additional embodiments.

BRIEF DESCRIPTION OF THE DRAWINGS

The present disclosure is further described in the detailed description which follows, in reference to the noted plurality of drawings by way of non-limiting examples of exemplary embodiments of the present disclosure, in which like reference numerals represent similar parts throughout the several views of the drawings, and wherein.

DETAILED DESCRIPTION OF THE DISCLOSURE

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description taken with the drawings making apparent to those skilled in the art how the forms of the present invention may be embodied in practice.

Figure 1:
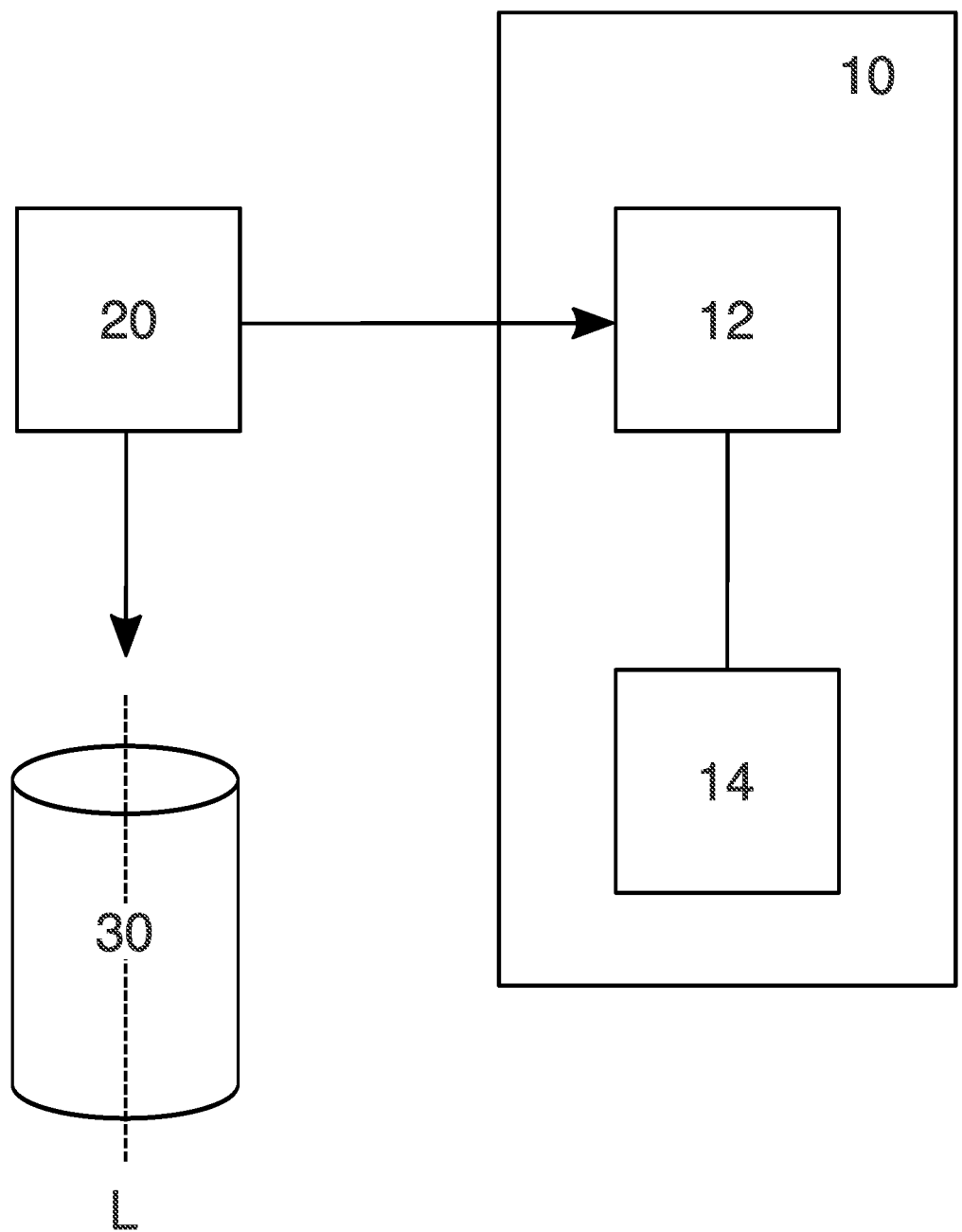
FIG. 1 shows an apparatus for measuring the two-point size of a workpiece.

Referring to the drawings wherein like characters represent like elements, FIG. 1 depicts an apparatus 10 for determining a two-point size of a workpiece 30 (e.g., a cylindrical workpiece 30 as shown in FIG. 1). A measuring apparatus 20 being communicatively coupled with the apparatus 10 is configured to measure the workpiece 30 to obtain a set of measuring points 50 of the workpiece. The set of measuring points is received by a receiving unit 12 of the apparatus 10. Alternatively, the apparatus 10 may include a measuring unit (not shown) for measuring the workpiece 30 from which the receiving unit 12 receives the set of measuring points 50.

The apparatus 10 further includes a determination unit 14 (also referred to as a determiner, determination circuit or a determination processor) for determining the two-point size of the workpiece 30 based on the set of measuring points 50 received by the receiving unit 12. The two-point size of the workpiece 30 is a distance between two points on the surface of the workpiece 30 opposed to each other with respect to a longitudinal axis L of the workpiece 30. As depicted in FIG. 1, the workpiece 30 is a substantially cylindrical workpiece 30, wherein the cylinder axis of the workpiece 30 corresponds to the longitudinal axis L. The term "substantially" means that the workpiece 30 has not a perfect shape and that the diameter of the cylindrical workpiece 30 may vary depending from the measurement position.

The measuring apparatus 20 and/or the measuring unit may be configured to measure the workpiece using a probe that samples the workpiece. The probe may be configured to contact the surface of the workpiece 30 for measuring the workpiece 30, e.g., with a stylus tip, or the probe may be configured to measure the surface of the workpiece 30 contactless, e.g., optically, computer tomography and/or x-ray based.

Figure 2:
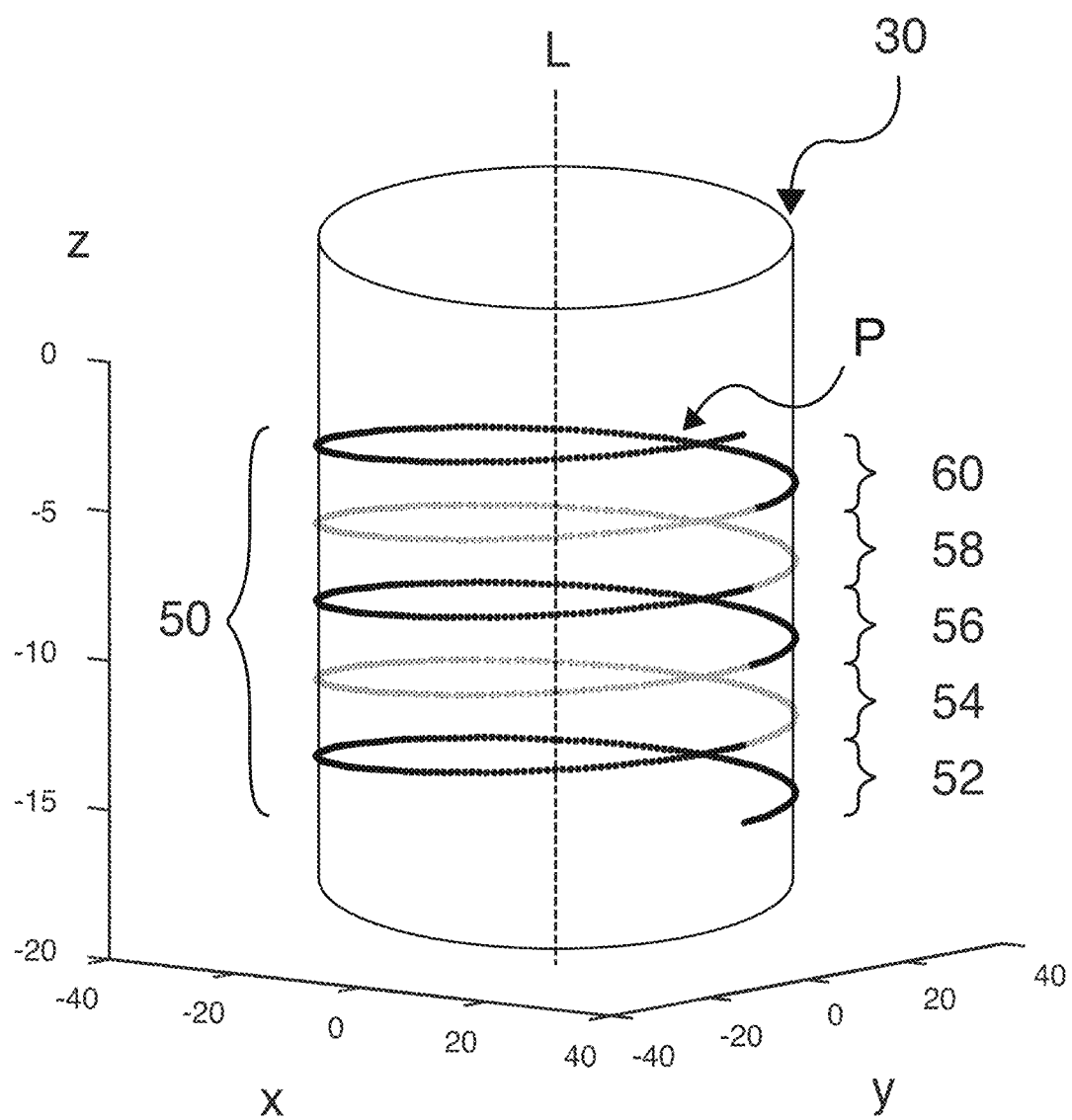
FIG. 2 shows a helix-measurement of a workpiece.

FIG. 2 depicts a set of measuring points 50 obtained with the measuring apparatus 20 or measuring unit by measuring the workpiece 30. Specifically, the set of measuring points 50 are obtained by a helix-measurement of the workpiece 30, wherein each measuring point of the set of measuring points 50 represents a 3D position information (e.g., a 3D coordinate represented by X, Y and Z coordinates) of a measured location of the workpiece's surface. With a helix-measurement, the surface of the workpiece may be measured along a path P having a substantially helical trajectory, e.g., a path P having the form of a screw's thread. Specifically, the helix-measurement results in a set of measuring points 50 having a substantially regular, non-zero axial difference along the longitudinal axis L of the workpiece 30 (e.g., the cylinder axis of a cylindrical workpiece 30) between consecutive and/or adjacent measuring points of the set of measuring points 50.

As depicted in FIG. 2, the workpiece 30 is measured with more than one revolution, each revolution being displaced along the longitudinal axis L of the workpiece 30. Thus, the set of measuring points 50 includes more than one subset of measuring points 52-60, each subset of measuring points 52-60 including measuring points of one revolution obtained with the helix-measurement. One revolution may be determined from the set of measuring points 50 by summing up the angular difference around the longitudinal axis L of the workpiece 30 between consecutive and/or adjacent measuring points up to 360 degrees.

As discussed above, the workpiece 30 may not have a perfect shape making it difficult to identify the longitudinal axis L of the workpiece 30. Accordingly, the determination unit 14 is configured to determine a longitudinal axis L based on the set of measuring points 50. Specifically, the determination unit 14 may determine a shape model of the workpiece 30 based on the set of measuring points. For example, the determination unit 14 may determine a Gaussian cylindrical shape model for the cylindrical workpiece 30. The Gaussian cylindrical shape model may be obtained by using the method of least squares on the set of measuring points 50 and/or at least a part of the set of measuring points 50. Thus, the Gaussian cylindrical shape model being arranged as close as possible to the set of measuring points 50 and/or to at least the part of the set of measuring points 50. Further, the determination unit 14 may provide the cylinder axis of the Gaussian cylindrical shape model as the longitudinal axis L of the workpiece 30.

Figure 3:
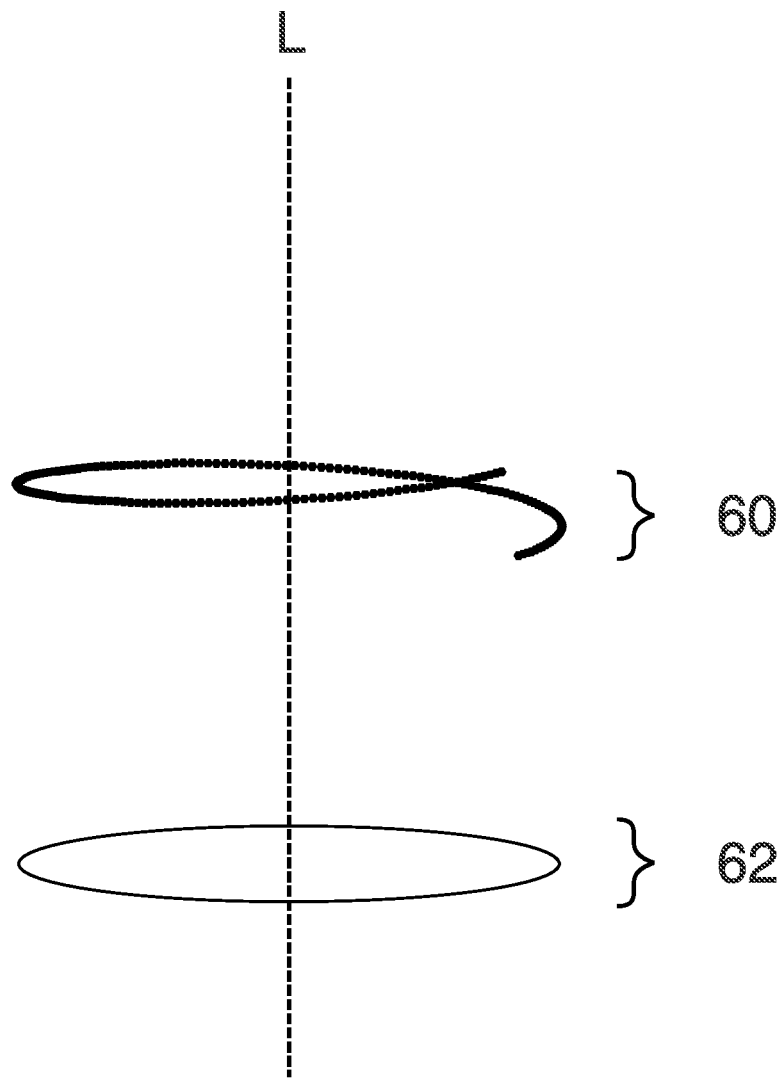
FIG. 3 shows a projection of measuring points into a projection plane.

With reference to FIG. 3, the determination unit 14 is further configured to project at least the part of the set of measuring points 50, particularly the substantially complete set of measuring points 50, into a projection plane perpendicular to the determined longitudinal axis L of the workpiece 30 to obtain a corresponding set of projection points. Further, the normal of the projection plane may be parallel to the longitudinal axis L. Moreover, at least the part of the measuring points 50, particularly the set of measuring points 50 may be projected parallel to the longitudinal axis L determined from the shape model. In case the set of measuring points 50 includes more than one subset of measuring points, particularly each subset of measuring points 52-60 is projected into the projection plane to obtain a corresponding subset of projection points 62. For the sake of simplicity, FIG. 3 depicts the projection of one subset of projection points 62 into a projection plane perpendicular to the longitudinal axis L to obtain a (one) corresponding subset of projection points 62.

Figure 4:
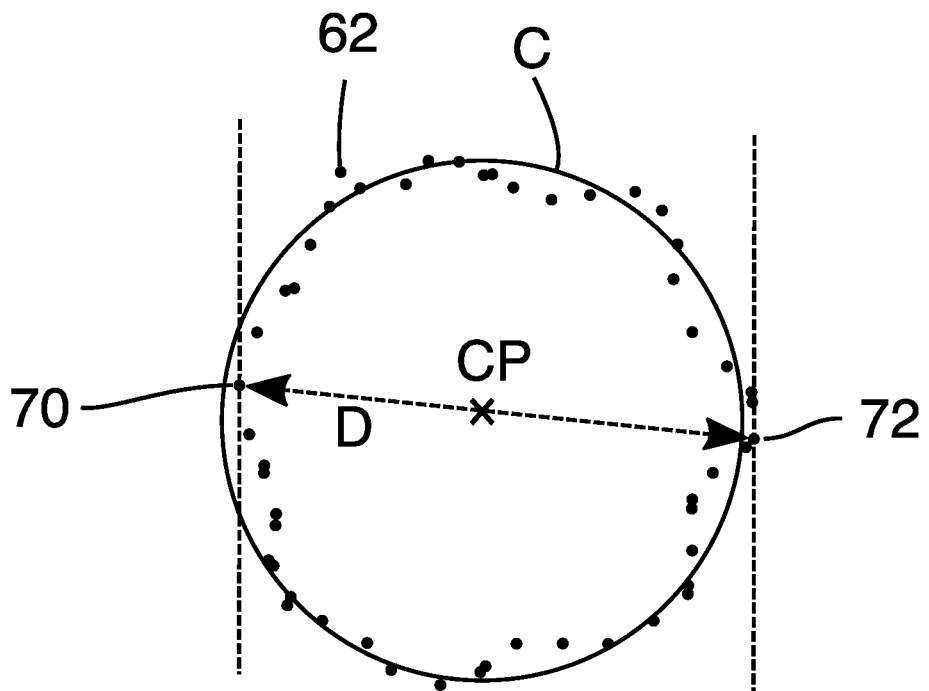
FIG. 4 shows a circle determined from a set of projection points.

With reference to FIG. 4, the determination unit 14 is further configured to determine the two-point size of the workpiece 30 based on the set of projection points. For simplification, FIG. 4 merely depicts the determination of the two-point size based on the subset of projection points 62. Based on the subset of projection points 62, the determination unit 14 determines a circle C representing the subset of projection points 62. For example, the circle C may be at least one of a Gaussian circle, a minimum circumscribed circle and a maximum inscribed circle. As illustrated in FIG. 4, it is preferred that the circle C is a Gaussian circle that lies in the middle between the subset of projection points 62 in the best possible way. Further, the minimum circumscribed circle is a circle where the subset of projection points 62 lies within the circle and the circle is at the same time as small as possible. The maximum inscribed circle is a circle where the subset of projection points 62 are outside the circle and at the same time the circle is as large as possible.

Once the circle C is determined, the determination unit 14 may determine a circle center CP of the circle C. For determining the two-point size of the workpiece 30, the determination unit 14 may determine the two-point size of the workpiece 30 by determining a pair of points 70, 72 based on the subset of projection points 62 which substantially oppose each other with respect to the circle center CP. Based on the pair of points 70, 72, the determination unit 14 may determine the two-point size based on the distance D of the pair of points 70, 72.

As shown in FIG. 4, the pair of points 70, 72 does not have to be actual projection points of the subset of projection points 62. For example, and as shown in FIG. 4, one point 70 of the pair of points 70, 72 may be a point of the subset of projection points 62 and the other point 72 of the pair of points 70, 72 may be determined by interpolation. An exemplary interpolation method may include, for a first projection point 70 of the subset of projection points 62, determining a connection line through said first projection point 70 and the circle center CP, determining a second projection point 72 from the subset of projection points 62, the second projection point being closest to the connection line and may have a distance to the first projection point 70 more than the radius of the circle C. The first projection point 70 and the second projection point 72 may form the pair of points and the two-point size may be the sum of the distance from the first projection point 70 to the circle center CP and the distance from the second projection point 72 to the circle center CP.

Further, the determination unit 14 may determine at least one of a minimum two-point size of the workpiece 30, a maximum two-point size of the workpiece 30 and an average two-point size of the workpiece 30 by analyzing the set of projection points.

As illustrated in FIG. 1, the apparatus 10 may include at least one processor. The processor is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor is an article of manufacture and/or a machine component. The processor is configured to execute software instructions in order to perform functions as described in the various embodiments herein. For example, the processor is configured to execute instructions such that the processor operates as a corrector that uses the stored amount of geometric error to correct the projection image, and a reconstructor that uses the corrected projection image to reconstruct a tomographic image.

The processor may be a general purpose processor or may be part of an application specific integrated circuit (ASIC). The processor may also be a microprocessor, a microcomputer, a processor chip, a controller, a microcontroller, a digital signal processor (DSP), a state machine, or a programmable logic device. The processor may also be a logical circuit, including a programmable gate array (PGA) such as a field programmable gate array (FPGA), or another type of circuit that includes discrete gate and/or transistor logic. The processor may be a central processing unit (CPU), a graphics processing unit (GPU), or both. Additionally, any processor described herein may include multiple processors, parallel processors, or both. Multiple processors may be included in, or coupled to, a single device or multiple devices.

The apparatus 10 may also include one or more computer memories. The computer memory may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disk read only memory (CD-ROM), digital versatile disk (DVD), floppy disk, blu-ray disk, or any other form of storage medium known in the art. Memories may be volatile or non-volatile, secure and/or encrypted, unsecure and/or unencrypted. Of course, the computer memory may include any combination of memories or a single storage.

The apparatus 10 may also include a medium reader which is configured to read any one or more sets of instructions, e.g. software, from any of the memories described herein. The instructions, when executed by a processor, can be used to perform one or more of the methods and processes as described herein. In a particular embodiment, the instructions may reside completely, or at least partially, within the memory, the medium reader, and/or the processor during execution by the apparatus 10.

The apparatus 10 is generally shown in FIG. 1 as a personal computer. However, those skilled in the art appreciate that, in alternative embodiments of the present application, the apparatus 10 may be a laptop computer, a tablet PC, a personal digital assistant, a mobile device, a palmtop computer, a desktop computer, a communications device, a wireless telephone, a personal trusted device, a web appliance, a server, a security camera, or any other device that is capable of executing a set of instructions, sequential or otherwise, that specify actions to be taken by that device. Of course, those skilled in the art appreciate that the above-listed devices are merely exemplary devices and that the apparatus 10 may be any additional device or apparatus commonly known and understood in the art without departing from the scope of the present application. Furthermore, those skilled in the art similarly understand that the device may be any combination of devices and apparatuses.

Of course, those skilled in the art appreciate that the above-listed components of the apparatus 10 are merely meant to be exemplary and are not intended to be exhaustive and/or inclusive. Furthermore, the examples of the components listed above are also meant to be exemplary and similarly are not meant to be exhaustive and/or inclusive.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

What is claimed is:

1. A computer-implemented method for determining a two-point size of a workpiece, the method comprising:
   receiving a set of measuring points of the workpiece;
   determining a longitudinal axis positioned at a center of the workpiece based on the set of measuring points;
   projecting at least a part of the set of measuring points into a projection plane perpendicular to the longitudinal axis to obtain a set of projection points, the set of projection points being two-dimensional points corresponding to the at least part of the set of measuring points; and
   determining a two-point size of the workpiece based on the projection points,
   wherein the two-point size of the workpiece is a distance between two of the projection points opposite each other with respect to the longitudinal axis of the workpiece.

2. The method of claim 1, wherein the set of measuring points includes measuring points obtained from one or both of a helix-measurement of the workpiece or the workpiece having a generally cylindrical shape.

3. The method of claim 1, wherein the determining of the longitudinal axis comprises:
   determining a shape model of the workpiece based on the set of measuring points; and
   providing the longitudinal axis of the shape model as the longitudinal axis of the workpiece.

4. The method of claim 3, wherein the shape model is a cylindrically-shaped model, and the longitudinal axis of the workpiece corresponds to a cylinder axis of the cylindrically-shaped model.

5. The method of claim 1, wherein the projecting of at least the part of the set of measuring points into the projection plane comprises projecting at least the part of the set of measuring points parallel to the longitudinal axis.

6. The method of claim 1, wherein the determining of the two-point size of the workpiece comprises:
   determining a circle center of a circle based on the set of projection points, wherein the circle is a Gaussian circle;
   determining a pair of points based on the set of projection points, wherein the pair of points oppose each other with respect to the circle center; and
   determining the two-point size by calculating the distance between the pair of points.

7. The method of claim 6, wherein:
   the pair of points includes at least one point of the set of projection points, and
   in a case where the other point of the pair of points is not included in the set of projection points, the method further comprises determining the other point by interpolation based on the set of projection points.

8. The method of claim 1, wherein:
   the set of measuring points includes at least one subset of measuring points corresponding to one revolution of the workpiece, and
   the set of projection points includes at least one subset of projection points corresponding to the at least one subset of measuring points.

9. The method of claim 8, wherein the determining of the two-point size of the workpiece comprises:
   determining a respective circle center of a circle based on the at least one subset of projection points;
   determining a respective pair of points based on the at least one subset of projection points, wherein the pair of points is opposite with respect to the circle center; and
   determining the two-point size by calculating the distance between the pair of points.

10. The method of claim 9, wherein:
the pair of points includes at least one point of the at least one subset of projection points, and
in case where the other point of the pair of points is not included in the at least one subset of projection points, the method further comprises determining the other point by interpolation based on the at least one subset of projection points.

11. An apparatus for determining a two-point size of a workpiece, the apparatus comprising a processor and a memory that stores a set of executable instructions, wherein upon execution of the executable instructions by the processor, the apparatus operates as:
a receiver configured to receive a set of measuring points of the workpiece; and
a determiner configured to:
determine a longitudinal axis positioned at a center of the workpiece based on the set of measuring points;
project at least a part of the set of measuring points into a projection plane perpendicular to the longitudinal axis to obtain a set of projection points, the set of projection points being two-dimensional points corresponding to the at least part of the set of measuring points; and
determine a two-point size of the workpiece based on the set of projection points,
wherein the two-point size of the workpiece is a distance between two of the projection points opposite each other with respect to the longitudinal axis of the workpiece.

12. At least one tangible, non-transitory computer-readable medium storing an executable set of instructions for determining a two-point size of a workpiece, wherein the set of instructions, when executed by a computer processor, causes the computer processor to execute operations comprising:
receiving a set of measuring points of the workpiece;
determining a longitudinal axis positioned at a center of the workpiece based on the set of measuring points;
projecting at least a part of the set of measuring points into a projection plane perpendicular to the longitudinal axis to obtain a set of projection points, the set of projection points being two-dimensional points corresponding to the at least part of the set of measuring points; and
determining a two-point size of the workpiece based on the projection points,
wherein the two-point size of the workpiece is a distance between two of the projection points opposite each other with respect to the longitudinal axis of the workpiece.

\* \* \* \* \*